(12) United States Patent
Finter et al.

(10) Patent No.: US 9,012,575 B2
(45) Date of Patent: Apr. 21, 2015

(54) EPOXY GROUP-TERMINATED POLYMERS, THE COMPOSITIONS THEREOF AND THE USE THEREOF AS IMPACT RESISTANCE MODIFIERS

(75) Inventors: Jürgen Finter, Zurich (CH); Andreas Kramer, Zurich (CH)

(73) Assignee: Sika Technology AG, Baar (CH)

( * ) Notice: Subject to any disclaimer, the term of this patent is extended or adjusted under 35 U.S.C. 154(b) by 1061 days.

(21) Appl. No.: 12/450,091

(22) PCT Filed: Mar. 20, 2008

(86) PCT No.: PCT/EP2008/053342
§ 371 (c)(1),
(2), (4) Date: Sep. 16, 2009

(87) PCT Pub. No.: WO2008/113845
PCT Pub. Date: Sep. 25, 2008

(65) Prior Publication Data
US 2010/0087567 A1 Apr. 8, 2010

(30) Foreign Application Priority Data
Mar. 20, 2007 (EP) .................................. 07104488

(51) Int. Cl.
C08G 63/00 (2006.01)
C08F 283/04 (2006.01)
C08G 18/00 (2006.01)
C08G 18/66 (2006.01)
C08G 18/12 (2006.01)
C08G 59/18 (2006.01)
C09J 163/00 (2006.01)

(52) U.S. Cl.
CPC ............ *C08G 18/6674* (2013.01); *C08G 18/12* (2013.01); *C08G 59/18* (2013.01); *C09J 163/00* (2013.01)

(58) Field of Classification Search
CPC ..................................................... C80L 75/04
USPC .................................. 523/400; 525/452, 453
See application file for complete search history.

(56) References Cited

U.S. PATENT DOCUMENTS

| 4,036,906 | A | * | 7/1977 | Finelli ................................ 528/61 |
| 4,069,208 | A | * | 1/1978 | Hoeschele ..................... 525/415 |
| 4,118,373 | A | * | 10/1978 | Orvik ............................... 528/73 |
| 4,804,710 | A | | 2/1989 | Nakata et al. |
| 5,668,227 | A | | 9/1997 | Wolleb et al. |
| 5,707,439 | A | | 1/1998 | Takekoshi et al. |
| 6,197,849 | B1 | | 3/2001 | Zilg et al. |
| 6,322,890 | B1 | | 11/2001 | Barron et al. |
| 8,076,424 | B2 | | 12/2011 | Kramer et al. |
| 2002/0061970 | A1 | | 5/2002 | Sawada |
| 2007/0066721 | A1 | | 3/2007 | Kramer et al. |
| 2007/0105983 | A1 | | 5/2007 | Kramer et al. |

FOREIGN PATENT DOCUMENTS

| DE | 2 123 033 | | 8/1972 |
| EP | 0 308 664 | A1 | 8/1988 |
| EP | 0 338 985 | B1 | 5/1994 |
| EP | 0 353 190 131 | | 3/1995 |
| EP | 1 152 019 | A1 | 11/2001 |
| EP | 1 728 825 | A1 | 12/2006 |
| JP | A-60-260619 | | 12/1985 |
| JP | A-63-39914 | | 2/1988 |
| JP | A-05-32758 | | 2/1993 |
| JP | A-06-271827 | | 9/1994 |
| JP | A-08-41174 | | 2/1996 |
| JP | A-2007-527453 | | 9/2007 |
| WO | WO 00/20483 | A2 | 4/2000 |
| WO | WO 01/23466 | A1 | 4/2001 |
| WO | WO 01/94492 | A1 | 12/2001 |
| WO | WO 03/078163 | A1 | 9/2003 |
| WO | WO 03/093387 | A1 | 11/2003 |
| WO | WO 2004/055092 | A1 | 7/2004 |
| WO | WO 2005/007720 | A1 | 1/2005 |
| WO | WO 2005/007766 | A1 | 1/2005 |
| WO | WO 2006/052726 | A1 | 5/2006 |
| WO | WO 2006/052729 | A1 | 5/2006 |
| WO | WO 2007/003650 | A1 | 1/2007 |
| WO | WO 2007/020266 | A1 | 2/2007 |

OTHER PUBLICATIONS

D. Chen et al., "Preparation and Characterization of Cryogenic Adhesives. I, Glycidyl-Terminated Polyurethane Resins", Journal of Applied Polymer Science, Feb. 14, 1994, p. 1199-1206, No. 7, New York, US.
Jul. 1, 2008 Search Report issued in International Application No. PCT/EP2008/053342 (with translation).
T. Hermel-Davidock et al, "Control of the Block Copolymer Morphology in Templated Epoxy Thermosets", Journal of Polymer Science: Part B: Polymer Physics, vol. 45, Nov. 1, 2007, p. 3338-3348.
Japanese Office Action dated Mar. 3, 2014 issued in Japanese Patent Application No. 2009-554028.
Japanese Office Action dated Sep. 8, 2014 issued in Japanese Patent Application No. 2009-554028.

* cited by examiner

Primary Examiner — Megan McCulley
(74) Attorney, Agent, or Firm — Oliff PLC

(57) ABSTRACT

The present invention relates to epoxy group-terminated polymers of the formula (I). Said epoxy group-terminated polymers are suited extremely well as impact resistance modifiers, particularly in epoxy resin compositions. They are particularly suited for use in heat-curing epoxy resin adhesives. It has been found that such epoxy resin compositions not only have excellent mechanical properties and high glass transition temperatures, but also above all improved impact resistance properties, both at room temperature and at low temperatures.

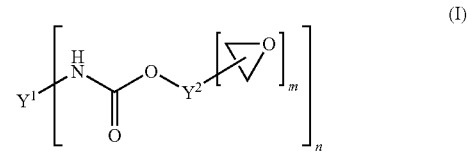

(I)

24 Claims, No Drawings

EPOXY GROUP-TERMINATED POLYMERS, THE COMPOSITIONS THEREOF AND THE USE THEREOF AS IMPACT RESISTANCE MODIFIERS

TECHNICAL FIELD

The invention pertains to the field of impact modifiers and to the field of epoxy resin compositions.

PRIOR ART

Impact modifiers already have a long history of use to improve the strength of adhesives on impact force exposure. Epoxy resin compositions in particular generally have high mechanical strengths but are very brittle; consequently, on exposure to an impact force, of the kind occurring, for example, in a vehicle collision, the cured epoxy resin fractures and leads to a destruction of the bond.

Liquid rubbers have been used for some considerable time for impact modification. For example, liquid rubbers based on acrylonitrile/butadiene copolymers are used, of the kind available, for example, under the Hycar® name.

WO-A-03/093387 discloses impact-resistant epoxy resin compositions which comprise adducts of dicarboxylic acids with glycidyl ethers or of bis(aminophenyl) sulfone isomers or aromatic alcohols with glycidyl ethers. These compositions, however, have shortcoming in their low-temperature impact strength (<0° C.).

WO-A-2004/055092, WO-A-2005/007720, and WO-A-2007/003650 disclose epoxy resin compositions featuring improved impact strength, comprising a reaction product of an isocyanate group-terminated polyurethane prepolymer with a monohydroxy epoxide. For certain applications, however, these compositions still lack optimum impact strengths, especially low-temperature impact strengths.

SUMMARY OF THE INVENTION

It is an object of the present invention, therefore, to provide impact modifiers which are capable of improving the impact strength of epoxy resins.

Surprisingly it has now been found that this object can be met by epoxide group-terminated polymers of claim 1. These epoxide group-terminated polymers are part of epoxy resin compositions of claim 11, more particularly of heat-curing epoxy resin compositions of claim 13, which represent a further aspect of the present invention. With particular surprise it has been found that it is possible to increase the impact strength relative to the prior art, in some cases greatly. It has emerged that it is even possible to obtain fracture energies of up to more than 20 J, both at room temperature and at minus 20° C. It is found, moreover, that these polymers can be used to obtain epoxy resin compositions which, in spite of the high impact strength, have excellent mechanical properties and also high glass transition temperatures. A particularly surprising finding has been that the fracture energies obtainable with such epoxy resin compositions at low temperatures (−20° C.) are almost equally high to those obtainable at room temperature.

Further aspects of the invention relate to a process for preparing these epoxide group-terminated polymers, of claim 7, the use of these epoxide group-terminated polymers as impact modifiers, of claim 21, or the use of these epoxy resin compositions as an adhesive, of claim 22.

Lastly, cured compositions of claim 23 and also adhesively bonded articles of claim 24 form further aspects of the present invention.

Particularly preferred embodiments are subject matter of the dependent claims.

DESCRIPTION OF THE PREFERRED EMBODIMENTS

The present invention provides in a first aspect an epoxide group-terminated polymer of the formula (I)

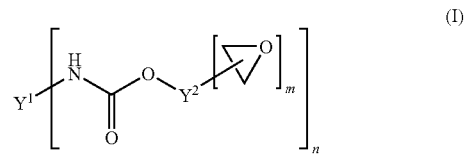

In this formula $Y^1$ is an n-valent radical of a linear or branched polyurethane polymer terminated with isocyanate groups, PU1, after the removal of the n terminal isocyanate groups. Moreover, $Y^2$ is a radical of an aliphatic, cycloaliphatic, aromatic or araliphatic epoxide containing a primary or secondary hydroxyl group, after the removal of the hydroxide groups and epoxide groups. Finally, m is a value of 1, 2 or 3 and n is a value from 2 to 8.

The polyurethane polymer PU1 is obtained from at least one diisocyanate or triisocyanate and from at least one nonphenolic diol $Q_1$ and at least one polymer $Q_2$ having terminal hydroxyl groups, thiol groups, primary amino groups or secondary amino groups. The nonphenolic diol $Q_1$ has a molecular weight of 60 to 400 g/mol and the polymer $Q_2$ has a molecular weight of 600 to 20,000 g/mol.

Substance names beginning with "poly", such as "polyol", "polyisocyanate", "polyamine" or "polyphenol", in the present document identify substances which formally contain two or more per molecule of the functional groups that occur in their name.

The term "polymer" in the present document embraces on the one hand a collective of macromolecules which, while being chemically uniform, nevertheless differ in respect of degree of polymerization, molar mass, and chain length, this collective of macromolecules having been prepared by a polymerization reaction (addition polymerization, polyaddition, polycondensation). On the other hand the term also encompasses derivatives of such a collective of macromolecules from polymerization reactions, in other words compounds which have been obtained by reactions, such as additions or substitutions, for example, of functional groups on existing macromolecules, and which may be chemically uniform or chemically nonuniform. The term further encompasses what are called prepolymers as well, in other words reactive oligomeric preadducts whose functional groups have participated in the construction of macromolecules.

The term "polyurethane polymer" encompasses all polymers which are prepared by the process known as the diisocyanate polyaddition process. This also includes those prepolymers which are virtually or entirely free from urethane groups. Examples of polyurethane polymers are polyether-polyurethanes, polyester-polyurethanes, polyether-polyureas, polyureas, polyester-polyureas, polyisocyanurates, and polycarbodiimides.

By "molecular weight" or "molar weight" is always meant in the present document the molecular weight average $M_n$.

The polyurethane polymer PU1 is obtained from at least one diisocyanate or triisocyanate and from at least one nonphenolic diol $Q_1$ having a molecular weight of 60 to 400 g/mol, and from at least one polymer $Q_2$ having terminal hydroxyl groups, thiol groups, primary amino groups or secondary amino groups, having a molecular weight of 600 to 20,000 g/mol.

Preferably the molar ratio $Q_2:Q_1$ has a value of 1:2 to 1:0.01, more preferably a value of 1:2 to 1:0.05, most preferably a value of 1:2 to 1:0.2.

Particularly suitable nonphenolic diols $Q_1$ are aliphatic, cycloaliphatic, and araliphatic diols.

Particularly suitable such nonphenolic diols $Q_1$ are
aliphatic diols, more particularly
  alkylenediols, especially ethylene glycol, 1,2-propanediol, 1,3-propanediol, 2-methyl-1,3-propanediol, dimethylpropanediols, especially 2,2-dimethyl-1,3-propanediol (i.e., neopentyl glycol), 1,2-butanediol, 1,3-butanediol, 1,4-butanediol, 2-butene-1,4-diol, 2,3-butanediol, methylbutanediols, dimethylbutanediols, 1,5-pentanediol, 1,2-pentanediol, 2,4-pentanediol, methylpentanediols, dimethylpentanediols, especially 2,4-dimethyl-2,4-pentanediol, trimethylpentanediols, 1,6-hexanediol, 1,2-hexanediol, 2,5-hexanediol, methylhexanediols, dimethylhexanediols, especially 2,5-dimethyl-2,5-hexanediol, 1,7-heptanediol, 2,6-heptanediol, 1,8-octanediol, 1,2-octanediol or 3,6-octanediol;
  polyoxyalkylene diols, especially diethylene glycol, dipropylene glycol, dibutylene glycol, triethylene glycol, tripropylene glycol, tributylene glycol, tetraethylene glycol, tetrapropylene glycol, tetrabutylene glycol, pentaethylene glycol, pentapropylene glycol, pentabutylene glycol, hexaethylene glycol, hexapropylene glycol, heptaethylene glycol, octaethylene glycol or polyoxyethylene/oxypropylene diols;
  alkylenediols containing cycloaliphatic substructures, especially cyclohexanedimethanol, tricyclodecanedimethanol, bis(hydroxylmethyl)tricyclo[5.2.1.0(2,6)]decane, and 2,5(2,6)-bis(hydroxylmethyl)bicyclo-[2.2.1]heptane;
  cycloaliphatic diols, especially cyclohexanediol, methylcyclohexanediol, dimethylcyclohexanediol, norbornanediol, hydrogenated bisphenol A (bis(4-hydroxycyclohexyl)methane), hydrogenated bisphenol F (bis(4-hydroxycyclohexyl)propane), cycloheptanediol, cyclooctanediol, and dicyclopentadienyl diol;
  araliphatic diols, especially xylylenediol, ethoxylated bisphenol A, propoxylated bisphenol A, ethoxylated bisphenol F, propoxylated bisphenol F.

The nonphenolic diol $Q_1$ is preferably a diol selected from the group consisting of ethylene glycol, butanediol, hexanediol, cyclohexanedimethanol, tricyclodecanedimethanol, 3(4),8(9)-bis(hydroxymethyl)tricyclo[5.2.1.0(2,6)]decane, xylylenediol, ethoxylated bisphenol A, and propoxylated bisphenol A.

More preferably the nonphenolic diol $Q_1$ is a diol selected from the group consisting of 1,4-butanediol, hexanediol, cyclohexanedimethanol, tricyclodecanedimethanol, 3(4),8(9)-bis(hydroxymethyl)tricyclo-[5.2.1.0(2,6)]decane, xylylenediol, ethoxylated bisphenol A, and propoxylated bisphenol A. Most preferably the nonphenolic diol $Q_1$ is an ethoxylated bisphenol A or a propoxylated bisphenol A.

Suitable polymers $Q_2$ having terminal hydroxyl groups, thiol groups, primary amino groups or secondary amino groups, with a molecular weight of 600 to 20,000 g/mol, are
a) polyols, more particularly
  polyoxyalkylene polyols, also called polyether polyols, which are the polymerization product of ethylene oxide, 1,2-propylene oxide, 1,2- or 2,3-butylene oxide, tetrahydrofuran or mixtures thereof, where appropriate polymerized with the aid of a starter molecule having two or three active H atoms, such as water, for example, or compounds having two or three OH groups. Use may be made not only of polyoxyalkylene polyols which have a low degree of unsaturation (measured by ASTM D-2849-69 and expressed in milliequivalents of unsaturation per gram of polyol (meq/g)), prepared for example using what are known as double metal cyanide complex catalysts (DMC catalysts for short), but also of polyoxyalkylene polyols having a higher degree of unsaturation, prepared for example with the aid of anionic catalysts such as NaOH, KOH or alkali metal alkoxides. Particularly suitable polyoxypropylene diols and triols are those having a degree of unsaturation of less than 0.02 meq/g and having a molecular weight in the range of 1000-30,000 daltons, polyoxybutylene diols and triols, polyoxypropylene diols and triols having a molecular weight of 600-8000 daltons, and also what are called EO-end capped (ethylene oxide-end capped) polyoxypropylene diols or triols. The latter are special polyoxypropylene-polyoxyethylene polyols which are obtained, for example, by alkoxylating pure polyoxypropylene polyols with ethylene oxide after the end of the polypropoxylation, and which as a result contain primary hydroxyl groups.
  hydroxy-terminated polybutadiene polyols, such as, for example, those prepared by polymerization of 1,3-butadiene and allyl alcohol or by oxidation of polybutadiene, and also their hydrogenation products;
  styrene-acrylonitrile grafted polyether polyols, as supplied, for example, by Elastogran under the name Lupranol®;
  polyhydroxy-terminated acrylonitrile/butadiene copolymers, of the kind preparable, for example, from carboxyl-terminated acrylonitrile/butadiene copolymers (available commercially under the name Hycar® CTBN from Nanoresins AG, Germany) and from epoxides or amino alcohols;
  polyester polyols prepared, for example, from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentylglycol, glycerol, 1,1,1-trimethylolpropane or mixtures of the aforementioned alcohols, with organic dicarboxylic acids or their anhydrides or esters, such as, for example, succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid, or mixtures of the aforementioned acids, and also polyester polyols from lactones such as ϵ-caprolactone, for example;
  polycarbonate polyols of the kind obtainable by reacting, for example, the abovementioned alcohols—those used to synthesize the polyester polyols—with dialkyl carbonates, diaryl carbonates or phosgene;
  polyols of the kind obtained by reduction of dimerized fatty acids;
b) polyamines, more particularly
  amino group-terminated polyethylene ethers or polypropylene ethers, as sold, for example, under the name Jeffamine® Huntsman;
  amino group-terminated polybutylene ethers, polybutadienes, butadiene/acrylonitrile copolymers, more particularly of the kind sold, for example, under the name Hycar® ATBN by Nanoresins AG, Germany;
  amino group-terminated synthetic rubbers;

c) polythiols (also identified as polymercaptans), more particularly dimercaptans, such as
polymercaptoacetates of polyols, more particularly polymercaptoacetates of the abovementioned polyols;
dimercaptans of the formula (II).

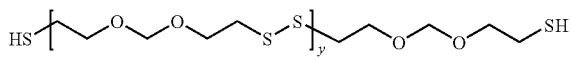

(II)

In this formula y is a value of 1 to 45, more particularly of 5 to 23. The preferred molecular weights are between 800 and 7500 g/mol, more particularly between 1000 and 4000 g/mol. Polymercaptans of this kind are available commercially within the Thiokol® LP series from Toray Fine Chemicals Co.

The polymer $Q_2$ having terminal hydroxyl groups, thiol groups, primary amino groups or secondary amino groups is preferably on the one hand an aliphatic or cycloaliphatic or araliphatic polyol, more particularly a polyoxyalkylene polyol, preferably a polyoxyalkylene diol.

The polymer $Q_2$ having terminal hydroxyl groups, thiol groups, primary amino groups or secondary amino groups is preferably on the other hand an aliphatic polyamine containing ether groups, more particularly a polyoxyalkylene polyamine having two or three primary amino groups.

Diisocyanates suitable for preparing the polyurethane polymer PU1 are aliphatic, cycloaliphatic, aromatic or araliphatic diisocyanates, especially commercial products such as methylenediphenyl diisocyanate (MDI), hexamethylene diisocyanate (HDI), toluene diisocyanate (TDI), tolidine diisocyanate (TODI), isophorone diisocyanate (IPDI), trimethylhexamethylene diisocyanate (TMDI), 2,5- or 2,6-bis(isocyanatomethyl)bicyclo[2.2.1]heptane, 1,5-naphthalene diisocyanate (NDI), dicyclohexylmethyl diisocyanate ($H_{12}$MDI), p-phenylene diisocyanate (PPDI), m-tetramethylxylylene diisocyanate (TMXDI), and their positional isomers and dimmers. Preference is given to HDI, IPDI, MDI or TDI.

Triisocyanates suitable for preparing the polyurethane polymer PU1 are trimers or biurets of aliphatic, cycloaliphatic, aromatic or araliphatic diisocyanates, especially the isocyanurates and biurets of the diisocyanates described in the preceding paragraph.

It will be appreciated that it is also possible to use suitable mixtures of diisocyanates or triisocyanates.

In one embodiment the isocyanate group-terminated polyurethane polymer PU1 can be prepared from a reaction of the diisocyanate or triisocyanate with a mixture of at least one nonphenolic diol $Q_1$ and at least one of the polymers $Q_2$.

In another, preferred, embodiment the preparation may take place by a reaction of the diisocyanate or triisocyanate with a polymer $Q_2$, to form a reaction product PU1' containing isocyanate groups, followed by a chain extension of this intermediate with a nonphenolic diol $Q_1$.

In another embodiment the preparation may take place by a reaction of the diisocyanate or triisocyanate with a nonphenolic diol $Q_1$, to form a reaction product PU1" containing isocyanate groups, followed by a chain extension of this intermediate with a polymer $Q_2$.

The epoxide group-terminated polymer of the formula (I) can be prepared from an isocyanate group-terminated linear or branched polyurethane polymer PU1 and from an aliphatic, cycloaliphatic, aromatic or araliphatic epoxide which contains a primary or secondary hydroxyl group.

The aliphatic, cycloaliphatic, aromatic or araliphatic epoxide which contains a primary or secondary hydroxyl group, also referred to in this document as monohydroxyl epoxide compound has the structure of the formula (III).

(III)

The monohydroxyl epoxide compound of the formula (III) contains 1, 2 or 3 epoxide groups. The hydroxyl group of this monohydroxyl epoxide compound (III) may be a primary or a secondary hydroxyl group.

Monohydroxyl epoxide compounds of this kind can be produced, for example, by reacting polyols with epichlorohydrin. Depending on the reaction regime, the reaction of polyfunctional alcohols with epichlorohydrin produces by-products including the corresponding monohydroxyl epoxide compounds in different concentrations. These can be isolated by routine separation operations. Generally speaking, however, it is sufficient to use the product mixture obtained in the glycidylization reaction of polyols, comprising fully reacted polyol and polyol which has reacted partially to form the glycidyl ether. Examples of hydroxyl-containing epoxides of this kind are butanediol monoglycidyl ether (contained in butanediol diglycidyl ether), hexanediol monoglycidyl ether (contained in hexanediol diglycidyl ether), cyclohexanedimethanol glycidyl ether, trimethylolpropane diglycidyl ether (contained as a mixture in trimethylolpropane triglycidyl ether), glycerol diglycidyl ether (contained as a mixture in glycerol triglycidyl ether), pentaerythritol triglycidyl ether (contained as a mixture in pentaerythritol tetraglycidyl ether). It is preferred to use trimethylolpropane diglycidyl ether, which occurs at a relatively high fraction in customarily prepared trimethylolpropane triglycidyl ether.

It is, however, also possible to use other, similar hydroxyl-containing epoxides, especially glycidol, 3-glycidyloxybenzyl alcohol or hydroxymethylcyclohexene oxide. Further preference is given to the β-hydroxy ether of the formula (IV), which is present at about 15% in commercial liquid epoxy resins prepared from bisphenol A (R=$CH_3$) and epichlorohydrin, and also to the corresponding β-hydroxy ethers of the formula (IV), which are formed in the reaction of bisphenol F (R=H) or of the mixture of bisphenol A and bisphenol F with epichlorohydrin.

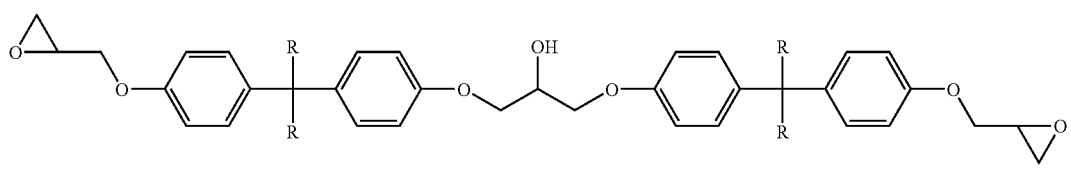

(IV)

Preference extends to distillation residues which are obtained in the preparation of high-purity, distilled liquid epoxy resins. Distillation residues of this kind have a concentration of hydroxyl-containing epoxides which is up to three times higher than that of commercial undistilled liquid epoxy resins. Moreover, it is also possible to use a wide variety of epoxides containing a β-hydroxy ether group, prepared by the reaction of (poly)epoxides with a substoichiometric amount of monofunctional nucleophiles such as carboxylic acids, phenols, thiols or secondary amines.

With particular preference the radical $Y^2$ is a trivalent radical of the formula

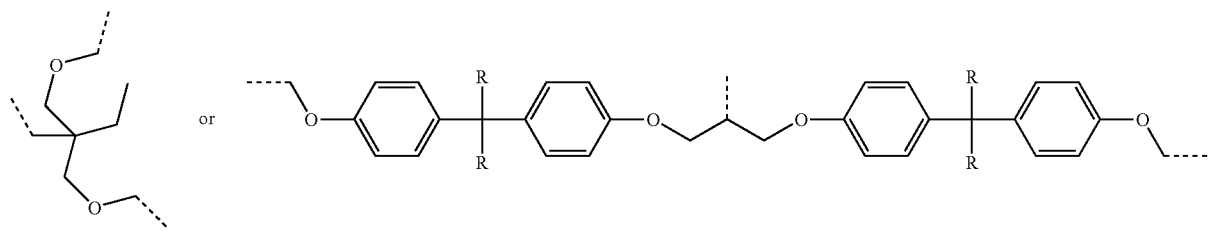

where R is methyl or H.

The free primary or secondary OH functionality of the monohydroxyl epoxide compound of the formula (III) allows efficient reaction with terminal isocyanate groups of polymers PU1, without the need to use disproportionate excesses of the epoxide component.

The reaction between the monohydroxyl epoxide compound of the formula (III) and the isocyanate group-terminated linear or branched polyurethane polymer PU1 takes place in a manner which is known per se to a person skilled in the art.

The epoxide group-terminated polymer of the formula (I) typically has an elastic character and moreover, is advantageously dispersible or soluble in liquid epoxy resins. It has broad applicability and can be used, for example, as an epoxy resin or as an addition to epoxy resin compositions.

More particularly it has been found that the epoxide group-terminated polymer of the formula (I) can be used outstandingly as an impact modifier, in other words as an agent for improving the impact strength, especially that of epoxy resins.

In a second aspect the present invention provides an epoxy resin composition which comprises at least one epoxy resin A having on average more than one epoxide group per molecule and also at least one epoxide group-terminated polymer of the formula (I), as described above.

The epoxide group of the epoxy resin A takes the form preferably of a glycidyl ether group. The epoxy resin A having on average more than one epoxide group per molecule is preferably a liquid epoxy resin or a solid epoxy resin. The term "solid epoxy resin" is very well known to a person skilled in the art and is used in contrast to "liquid epoxy resins". The glass transition temperature of solid resins is above room temperature, i.e., they can be comminuted to pourable powders at room temperature.

Preferred solid epoxy resins have the formula (V)

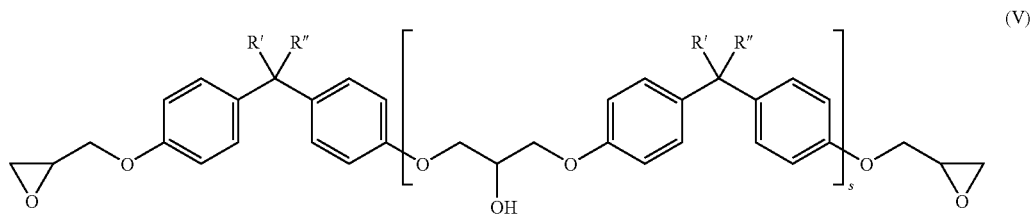

In this formula the substituents R' and R" independently of one another are either H or $CH_3$. In this document the use of the term "independently of one another" in connection with substituents, radicals or groups is to be interpreted to mean that the same molecule may simultaneously contain the identically identified substituents, radicals or groups simultaneously with different definitions.

Moreover, the index s is a value of >1.5, more particularly from 2 to 12.

Solid epoxy resins of this kind are available commercially from, for example, Dow or Huntsman or Hexion.

Compounds of the formula (V) having an index s of between 1 and 1.5 are referred to by a person skilled in the art as semisolid epoxy resins. For the present invention they are viewed likewise as solid resins. Preference, however, is given to epoxy resins in the narrower sense, i.e., where the index s has a value of >1.5.

Preferred liquid epoxy resins have the formula (VI)

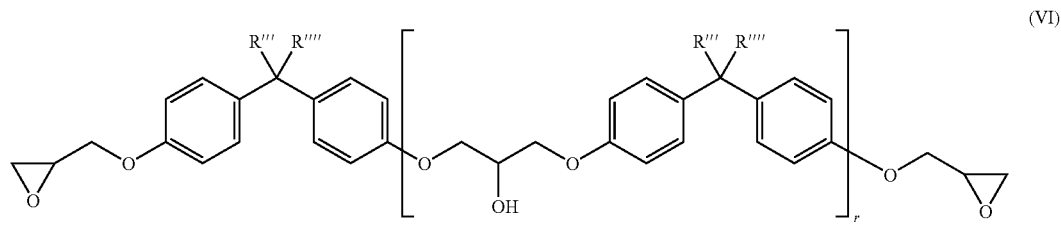

(VI)

In this formula the substituents R''' and R'''' independently of one another are either H or CH$_3$. Moreover, the index r is a value of 0 to 1. Preferably r is a value of less than 0.2.

These are therefore preferably diglycidyl ethers of bisphenol A (DGEBA), of bisphenol F, and of bisphenol A/F (the 'A/F' designation here refers to a mixture of acetone with formaldehyde that is used as a reactant in its preparation). Liquid resins of this kind are available for example as Araldite® GY 250, Araldite® PY 304, Araldite® GY 282 (Huntsman) or D.E.R.™ 331 or D.E.R.™ 330 (Dow) or Epikote 828 (Hexion).

The epoxy resin A is preferably a liquid epoxy resin of the formula (VI). In an even more preferred embodiment the heat-curing epoxy resin composition comprises not only at least one liquid epoxy resin of the formula (VI) but also at least one solid epoxy resin of the formula (V).

The fraction of epoxy resin A is preferably 10%-85%, more particularly 15%-70%, preferably 15%-60%, by weight, based on the weight of the composition.

The fraction of the epoxide group-terminated polymer of the formula (I) is preferably 1%-45% by weight, more particularly 3%-30% by weight, based on the weight of the composition.

The epoxy resin composition may be room temperature curing or heat curing.

In the case of the room temperature-curing epoxy resin compositions the curing takes place by the admixing of a hardener component which typically comprises a polyamine or a polymercaptan.

In the case of the heat-curing epoxy resin compositions the curing takes place at an elevated temperature as a result of the presence of a heat-activable hardener.

The epoxy resin composition is preferably a heat-curing epoxy resin composition. Accordingly, in one preferred embodiment, the epoxy resin composition further comprises at least one hardener B for epoxy resins which is activated by elevated temperature, and is heat curing. This is preferably a hardener selected from the group consisting of dicyandiamide, guanamines, guanidines, aminoguanidines, and derivatives thereof. Additionally possible are hardeners having an accelerating activity, such as substituted ureas, such as, for example, 3-chloro-4-methylphenylurea (chlortoluron), or phenyl-dimethyl-ureas, more particularly p-chlorophenyl-N, N-dimethylurea (monuron), 3-phenyl-1,1-dimethylurea (fenuron) or 3,4-dichlorophenyl-N,N-dimethylurea (diuron). Additionally it is possible to use compounds from the class of the imidazoles, such as 2-isopropylimidazole or 2-hydroxy-N-(2-(2-(2-hydroxyphenyl)-4,5-dihydroimidazol-1-yl) ethyl)benzamide, and amine complexes.

Preferably the hardener B is a hardener selected from the group consisting of dicyandiamide, guanamines, guanidines, aminoguanidines, and derivatives thereof; substituted ureas, more particularly 3-chloro-4-methylphenylurea (chlortoluron), or phenyl-dimethylureas, more particularly p-chlorophenyl-N,N-dimethylurea (monuron), 3-phenyl-1,1-dimethylurea (fenuron), 3,4-dichlorophenyl-N,N-dimethylurea (diuron), and also imidazoles and amine complexes.

A particularly preferred hardener B is dicyandiamide.

The total fraction of the hardener B is advantageously 0.5%-12% by weight, preferably 1%-8% by weight, based on the weight of the overall composition.

The epoxy resin composition, more particularly the heat-curing epoxy resin composition may further comprise a thixotropic agent C based on a urea derivative. The urea derivative is more particularly a reaction product of an aromatic monomeric diisocyanate with an aliphatic amine compound. It is also entirely possible to react two or more different monomeric diisocyanates with one or more aliphatic amine compounds, or one monomeric diisocyanate with two or more aliphatic amine compounds. The reaction product of 4,4'-diphenylmethylene diisocyanate (MDI) with butylamine has proven particularly advantageous.

The urea derivative is preferably present in a carrier material. The carrier material may be a plasticizer, more particularly a phthalate or an adipate, preferably a diisodecyl phthalate (DIDP) or dioctyl adipate (DOA). The carrier agent may also be a nondiffusing carrier agent. This is preferred in order to ensure minimal migration after curing of unreacted constituents. Preferred nondiffusing carrier agents are blocked polyurethane prepolymers.

The preparation of such preferred urea derivatives and carrier materials are described in detail in patent application EP 1 152 019 A1. The carrier material is advantageously a blocked polyurethane polymer PU2, obtained more particularly by reaction of a trifunctional polyether polyol with IPDI and subsequent blocking of the terminal isocyanate groups with ε-caprolactam.

The total fraction of the thixotropic agent C is advantageously 0%-40% by weight, preferably 5%-25% by weight, based on the weight of the overall composition. The ratio of the weight of the urea derivative to the weight of any carrier agent present is preferably 2/98 to 50/50, more particularly 5/95-25/75.

The epoxy resin composition, more particularly the heat-curing epoxy resin composition, preferably further comprises a liquid rubber D, which is preferably a carboxyl- or epoxide-terminated polymer.

In one embodiment this liquid rubber D is a carboxyl- or epoxide-terminated acrylonitrile/butadiene copolymer or a derivative thereof. Liquid rubbers of this kind are available commercially for example under the name Hycar® CTBN and CTBNX and ETBN from Nanoresins AG, Germany. Derivatives that are suitable are, in particular, elastomer-modified polymers containing epoxide groups, of the kind sold commercially under the product line Polydis®, preferably from the product line Polydis® 36. . . , by Struktol®

(Schill+Seilacher Gruppe, Germany) or under the product line Albipox (Nanoresins, Germany).

In another embodiment this liquid rubber D is a liquid polyacrylate rubber which is fully miscible with liquid epoxy resins and which separates into microdroplets only when the epoxy resin matrix is cured. Liquid polyacrylate rubbers of this kind are available, for example, under the designation 20208-XPA from Rohm & Haas.

In another embodiment this liquid rubber D is a copolymer which is fully miscible with liquid epoxy resins and which separates into microdroplets only when the epoxy resin matrix is cured. Copolymers of this kind may be reactive or nonreactive with epoxy resins; more particularly these copolymers are amphiphilic block copolymers. Suitable such copolymers are, in particular, diblock and triblock copolymers. Most preferred as copolymers of this kind are liquid copolymers of ethylene oxide and also at least one further alkylene oxide, preferably from the group consisting of propylene oxide, butylene oxide, hexylene oxide, and dodecylene oxide. Suitable liquid copolymers are those available commercially under the product line Fortegra™ from Dow Chemical.

Particularly suitable liquid rubbers D are those as disclosed in the following articles and patents, whose content is hereby included by reference: EP 0 308 664 A1, especially formula (I), particularly page 5 line 14 to page 13 line 24; EP 0 338 985 A1, EP 0 353 190 A1, WO 00/20483 A1, especially formula (I), particularly page 8 line 18 to page 12 line 2; WO 01/94492 A1, especially the reaction products identified as D) and E), particularly page 10 line 15 to page 14 line 22; WO 03/078163 A1, especially the acrylate-terminated polyurethane resin identified as B), particularly page 14 line 6 to page 14 line 35; WO 2005/007766 A1, especially formula (I) or (II), particularly page 4 line 5 to page 11 to line 20; EP 1 728 825 A1, especially formula (I), particularly page 3 line 21 to page 4 to line 47; WO 2006/052726 A1, especially the ambiphilic block copolymer identified as b), particularly page 6 line 17 to page 9 line 10; WO 2006/052729 A1, especially the ambiphilic block copolymer identified as b), particularly page 6 line 25 to page 10 line 2; T. J. Hermel-Davidock et al., *J. Polym. Sci. Part B: Polym. Phys.* 2007, 45, 3338-3348, especially the ambiphilic block copolymers, particularly page 3339, column 2 to 3341, column 2; WO 2004/055092 A1, especially formula (I), particularly page 7 line 28 to page 13 to line 15; WO 2005/007720 A1, especially formula (I), particularly page 8 line 1 to page 17 to line 10; WO 2007/020266 A1, especially formula (I), particularly page 3 line 1 to page 11 to line 6, and also DE-A-2 123 033.

It is clear to a person skilled in the art that, of course, mixtures of liquid rubbers can also be used, especially mixtures of carboxyl- or epoxide-terminated acrylonitrile/butadiene copolymers or of derivatives thereof.

The liquid rubber D is used advantageously in an amount of 1%-35% by weight, more particularly 1%-25% by weight, based on the weight of the composition.

The epoxy resin composition, more particularly the heat-curing epoxy resin composition, preferably further comprises a solid toughener E. By a "toughener" here and below is meant an addition to an epoxy resin matrix which even at low levels of addition of 0.1%-15% by weight, more particularly of 0.5%-8% by weight, produces a significant increase in the toughness and is therefore capable of absorbing higher flexural, tensile, impact or shock stress before the matrix tears or ruptures.

The solid toughener E is in one embodiment an organic ion-exchanged laminar mineral E1.

The ion-exchanged laminar mineral E1 may be either a cation-exchanged laminar mineral E1c or an anion-exchanged laminar mineral E1a.

The cation-exchanged laminar mineral E1c is obtained in this case from a laminar mineral E1' in which at least some of the cations have been exchanged for organic cations. Examples of cation-exchanged laminar minerals E1c of this kind are more particularly those as mentioned in U.S. Pat. No. 5,707,439 or in U.S. Pat. No. 6,197,849. Also described there is the process for preparing these cation-exchanged laminar minerals E1c. A preferred laminar mineral E1' is a laminar silicate. With particular preference the laminar mineral E1' is a phyllosilicate, of the kind described in U.S. Pat. No. 6,197,849 column 2 line 38 to column 3 line 5, more particularly a bentonite. Laminar minerals E1' such as kaolinite or a montmorillonite or a hectorite or an illite have emerged as being particularly suitable.

At least some of the cations of the laminar mineral E1' are replaced by organic cations. Examples of such cations are n-octylammonium, trimethyldodecylammonium, dimethyldodecylammonium or bis(hydroxyethyl)octadecylammonium, or similar derivatives of amines which can be obtained from natural fats and oils; or guanidinium cations or amidinium cations; or cations of the N-substituted derivatives of pyrrolidine, piperidine, piperazine, morpholine, thiomorpholine; or cations of 1,4 diazabicyclo[2.2.2]octane (DABCO) and 1-azabicyclo[2.2.2]octane; or cations of N-substituted derivatives of pyridine, pyrrole, imidazole, oxazole, pyrimidine, quinoline, isoquinoline, pyrazine, indole, benzimidazole, benzoxazole, thiazole, phenazine, and 2,2'-bipyridine. Additionally suitable are cyclic amidinium cations, more particularly those as disclosed in U.S. Pat. No. 6,197,849 in column 3 line 6 to column 4 line 67. Cyclic ammonium compounds are distinguished over linear ammonium compounds by an increased thermal stability, since they cannot be subject to the thermal Hoffmann degradation.

Preferred cation-exchanged laminar minerals E1c are known to a person skilled in the art by the term of organoclay or nanoclay, and are available commercially, for example, under the group names Tixogel® or Nanofil®(Südchemie), Cloisite® (Southern Clay Products) or Nanomer® (Nanocor Inc.).

The anion-exchanged laminar mineral E1a is obtained here from a laminar mineral E1", in which at least some of the anions have been exchanged for organic anions. An example of a laminar mineral E1a anion-exchanged in this way is a hydrotalcite E1" in which at least some of the carbonate anions of the interlayers have been exchanged for organic anions. A further example are functionalized aluminoxanes as described in U.S. Pat. No. 6,322,890, for example.

It is entirely possible as well for the composition to comprise simultaneously a cation-exchanged laminar mineral E1c and an anion-exchanged laminar mineral E1a.

In another embodiment the solid toughener is a block copolymer E2. The block copolymer E2 is obtained from an anionic or controlled free-radical polymerization of methacrylic ester with at least one further monomer containing an olefinic double bond. Preferred monomers containing an olefinic double bond are more particularly those in which the double bond is conjugated directly with a heteroatom or with at least one further double bond. Especially suitable monomers are those selected from the group encompassing styrene, butadiene, acrylonitrile, and vinyl acetate. Preference is given to acrylate-styrene-acrylic acid (ASA) copolymers, obtainable, for example, under the name GELOY 1020 from GE Plastics.

Particularly preferred block copolymers E2 are block copolymers of methyl methacrylate, styrene, and butadiene, Block copolymers of this kind are available, for example, as triblock copolymers under the group designation SBM from Arkema.

In another embodiment the solid toughener E is a core-shell polymer E3. Core-shell polymers are composed of an elastic core polymer and of a rigid shell polymer. Especially suitable core-shell polymers are composed of a core of elastic acrylate or butadiene polymer around a rigid shell of a rigid thermoplastic polymer. This core-shell structure forms either spontaneously by separation of a block copolymer, or is dictated by the polymerization regime as a latex or suspension polymerization with subsequent grafting. Preferred core-shell polymers are what are called MBS polymers, which are available commercially under the trade name Clearstrength™ from Atofina, Paraloid™ from Rohm & Haas or F-351™ from Zeon.

Particularly preferred core-shell polymer particles are those already in the form of a dried polymer latex. Examples of such are GENIOPERL M23A from Wacker, with polysiloxane core and acrylate shell; radiation-crosslinked rubber particles of the NEP series, produced by Eliokem; or Nanoprene from Lanxess; or Paraloid EXL from Rohm & Haas.

Further, comparable examples of core-shell polymers are offered under the name Albidur™ by Nanoresins AG, Germany.

In yet another embodiment the solid toughener E is a solid reaction product E4 of a carboxylated solid nitrile rubber with excess epoxy resin.

Preferred solid tougheners E are core-shell polymers.

The solid toughener E is present preferably in an amount of 0.1%-15% by weight, more particularly of 0.5%-8% by weight, based on the weight of the composition.

The epoxy resin composition, more particularly the heat-curing epoxy resin composition, advantageously further comprises at least one filler F. This preferably involves mica, talc, kaolin, wollastonite, feldspar, syenite, chlorite, bentonite, montmorillonite, illite, calcium carbonate (precipitated or ground), dolomite, quartz, silicas (fumed or precipitated), cristobalite, calcium oxide, aluminum hydroxide, magnesium oxide, hollow ceramic beads, hollow or solid glass beads, hollow organic beads, or color pigments. Filler F means both the organically coated and the uncoated forms which are commercially available and known to the person skilled in the art.

The total fraction of the overall filler F is advantageously 3%-50% by weight, preferably 5%-35% by weight, in particular 5%-25% by weight, based on the weight of the overall composition.

The epoxy resin composition, more particularly the heat-curing epoxy resin composition, may additionally further comprise at least one epoxide group-bearing reactive diluent G. These reactive diluents G are particularly:

glycidyl ethers of monofunctional saturated or unsaturated, branched or unbranched, cyclic or open-chain $C_4$-$C_{30}$ alcohols, e.g., butanol glycidyl ether, hexanol glycidyl ether, 2-ethylhexanol glycidyl ether, allyl glycidyl ether, tetrahydrofurfuryl and furfuryl glycidyl ether, trimethoxysilyl glycidyl ether, etc.

glycidyl ethers of difunctional saturated or unsaturated, branched or unbranched, cyclic or open-chain $C_2$-$C_{30}$ alcohols, e.g., ethylene glycol, butanediol, hexanediol, octanediol glycidyl ethers, cyclohexanedimethanol diglycidyl ether, neopentylglycol diglycidyl ether, etc.

glycidyl ethers of trifunctional or polyfunctional, saturated or unsaturated, branched or unbranched, cyclic or open-chain alcohols such as epoxidized castor oil, epoxidized trimethylolpropane, epoxidized pentaerythritol, or polyglycidyl ethers of aliphatic polyols such as sorbitol, glycerol, trimethylolpropane, etc.

glycidyl ethers of phenol compounds and aniline compounds, such as phenyl glycidyl ether, cresyl glycidyl ether, p-tert-butylphenyl glycidyl ether, nonylphenol glycidyl ether, 3-n-pentadecenyl glycidyl ether (from cashew nut shell oil), N,N-diglycidylaniline, etc.

epoxidized amines such as N,N-diglycidylcyclohexylamine etc.

epoxidized monocarboxylic or dicarboxylic acids, such as glycidyl neodecanoate, glycidyl methacrylate, glycidyl benzoate, diglycidyl phthalate, tetrahydrophthalate, and hexahydrophthalate, diglycidyl esters of dimeric fatty acids, etc.

epoxidized difunctional or trifunctional, low to high molecular weight polyether polyols, such as polyethylene glycol diglycidyl ether, polypropylene glycol diglycidyl ether, etc.

Particular preference is given to hexanediol diglycidyl ether, cresyl glycidyl ether, p-tert-butylphenyl glycidyl ether, polypropylene glycol diglycidyl ether, and polyethylene glycol diglycidyl ether.

Advantageously the total fraction of the epoxide group-bearing reactive diluent G is 0.5%-20% by weight, preferably 1%-8% by weight, based on the weight of the overall composition.

The epoxy resin composition, more particularly the heat-curing epoxy resin composition, may further comprise a blowing agent. The blowing agent may be a physical or chemical blowing agent, as obtainable, for example, under the trade name Expancel™ from Akzo Nobel or Celogen™ from Chemtura. The fraction of the blowing agent is advantageously 0.1%-3% by weight, based on the weight of the composition.

Finally the epoxy resin composition, more particularly the heat-curing epoxy resin composition, may also comprise further constituents, especially catalysts, heat stabilizers and/or light stabilizers, thixotropic agents, platicizers, solvents, organic or mineral fillers, blowing agents, dyes, and pigments.

It has been found that the epoxy resin compositions described, especially the heat-curing epoxy resin compositions, are especially suitable as adhesives.

The heat-curing epoxy resin compositions are especially suitable as one-component adhesives. Accordingly, in a further aspect, the invention provides for use of the above-described heat-curing epoxy resin composition as a one-component heat-curing adhesive. A one-component adhesive of this kind has broad possibilities for use. In particular it is possible therewith to realize heat-curing one-component adhesives which are distinguished by a high impact strength, both at relatively high temperatures and especially at low temperatures, more particularly between 0° C. to −20° C. Adhesives of this kind are needed for the bonding of heat-stable materials. Heat-stable materials are materials which are dimensionally stable, at least during the cure time, at a curing temperature of 100-220° C., preferably 120-200° C. More particularly they are metals and plastics such as polyamide, polyphenylene ethers, composite materials such as SMC, unsaturated polyester GRP, epoxy composites or acrylate composites. Preference is given to application where at least one material is a metal. A particularly preferred use is the adhesive bonding of alike or different metals, particularly in body shell construction in the automobile industry. The preferred metals are principally steel, especially electrolytically galvanized, hot dip galvanized, oiled steel, Bonazinc-coated steel, and subsequently phosphated steel, and also aluminum, particularly in the versions that are typically encountered in automaking.

With an adhesive based on a heat-curing composition of the invention it is possible to achieve the desired combination of high crash resistance at both high and low service temperatures. In addition to this, the composition exhibits high mechanical values. More particularly it has emerged that glass transition temperatures of above 80° C., in particular of 90° C. or more, in some cases higher than 100° C., can be achieved, and this is particularly important for applications involving high operating temperatures.

A further aspect of the invention therefore concerns a method of adhesively bonding heat-stable materials wherein these materials are contacted with an above-described epoxy resin composition, and which comprises one or more steps of heating of the composition to a temperature of 100-220° C., preferably 120-200° C. An adhesive of this kind is in particular first contacted with the materials to be bonded, at a temperature of between 10° C. and 80° C., more particularly between 10° C. and 60° C., and is subsequently cured at a temperature of typically 100-220° C., preferably 120-200° C.

A method of this kind for adhesively bonding heat-stable materials results in an adhesively bonded article, which represents a further aspect of the present invention. An article of this kind is preferably a vehicle or a component for installation in or on a vehicle.

A composition of the invention can of course be used to realize not only heat-curing adhesives but also sealants or coatings. Furthermore, the compositions of the invention are suitable not only for automobile construction but also for other fields of application. Particularly noteworthy are related applications in the construction of means of transport such as boats, trucks, buses or rail vehicles, or in the construction of consumer goods such as washing machines, for example.

The materials bonded by means of a composition of the invention can be used at temperatures between typically 120° C. and −40° C., preferably between 100° C. and −40° C., more particularly between 80° C. and −40° C.

It is possible to formulate compositions which typically have fracture energies, measured in accordance with ISO 11343, of more than 14.0 J at 23° C. and more than 13.0 J at −20° C. In certain cases it is possible to formulate compositions which have fracture energies of more than 17.0 J at 23° C. and of more than 17.0 J at −20° C. Particularly advantageous compositions even have fracture energies of more than 20.0 J at 23° C. and of more than 19.5 J at −20° C.

A particularly surprising finding was that the level of the low-temperature impact strength, in particular, is surprisingly high. Thus it is possible to obtain compositions which at −20° C. have substantially the same fracture energies as at room temperature. In certain cases it has even been possible to observe instances where the fracture energy at −20° C. is higher than at room temperature. This is of course of great interest particularly for applications at low temperatures, typically of below 0° C.

One particularly preferred application of the heat-curing epoxy resin composition of the invention is its application as a heat-curing body shell adhesive in vehicle construction.

EXAMPLES

A number of examples will be shown below that provide further illustration of the invention but which are not intended in any way to limit the scope of the invention. The raw materials used in the examples are listed in Table 1.

TABLE 1

Raw materials used.

| Raw materials used | Supplier |
|---|---|
| D.E.R. 330 (bisphenol A diglycidyl ether = "DGEBA") | Dow |
| Araldite ® GT7071 ("type-1.5" solid resin) (EP equivalent weight 475-550 g/eq) | Huntsman |
| Dicyandiamide | Degussa |
| 1,2-Ethylene glycol | Sigma-Aldrich |
| 1,4-Butanediol | Sigma-Aldrich |
| Neopentyl glycol | Sigma-Aldrich |
| 1,6-Hexanediol | Sigma-Aldrich |
| Tricyclodecanedimethanol (TCD alcohol, "TCD") | Sigma-Aldrich |
| 2,2-Bis[4-(2-hydroxyethoxy)phenyl]propane (Dianol 220) | AKZO |
| PolyTHF ® 2000 | BASF |
| Bisphenol A | Sigma-Aldrich |
| Aerosil ® R 202 ("R202") | Degussa |
| 2,2'-Diallylbisphenol A ("DABPA") | Sigma-Aldrich |

Example of Preparation of A Monohydroxyl-containing Epoxide TMPDGE

Trimethylolpropane glycidyl ether was prepared by the method in U.S. Pat. No. 5,668,227, Example 1, from trimethylolpropane and epichlorohydrin with tetramethylammonium chloride and aqueous sodium hydroxide solution. This gives a yellowish product having an epoxide number of 7.5 eq/kg and a hydroxyl group content of 1.8 eq/kg. From the HPLC-MS spectrum it can be concluded that the product is substantially a mixture of trimethylolpropane diglycidyl ether and trimethylolpropane triglycidyl ether. This product was used below as TMPDGE.

Monohydroxyl-containing epoxide: D DGEBA 1,3-Bis(4-(2-(4-(oxiran-2-ylmethoxy)phenyl)propan-2-yl)phenoxy)propan-2-ol) was obtained from technical bisphenol A diglycidyl ether Araldite® GY 250, manufacturer: Huntsman), in which it is present at about 15% by weight. It can be concentrated by distillative removal of bisphenol A diglycidyl ether. In a thin-film evaporator (manufacturer: Ilmag), at a heating jacket temperature of 180° C. and under an oil-pump vacuum, technical bisphenol A diglycidyl ether (epoxy equivalent weight (EEW)=195 g/epoxide equivalent, determined by titration) is metered with a membrane pump at 200 ml/h. Pure bisphenol A diglycidyl ether is distilled off, and crystallizes at room temperature. The liquid phase remaining has an EEW=207.1 g/epoxide equivalent and an OH number of 49.4 mg/g KOH. With tetrahydrofuran (THF) as solvent, the GPC diagram shows an area ratio of the peaks of "DGEBA dimer" and monomeric DGEBA of 40:60. This product was used below as D DGEBA.

Example of Preparation of an Epoxide Group-terminated Polyurethane Polymer of the Formula (I): Example 1

167.5 g of polyTHF® 2000 (OH number 51.6 mg/g KOH) and 15.40 g of 1,4-butanediol were dried at 105° C. under reduced pressure for 30 minutes.

When the temperature had been reduced to 90° C., 74.4 g of IPDI and 0.05 g of dibutyltin dilaurate were added. The reaction was carried out under reduced pressure at 90° C. until the NCO content was constant at 2.5% after 2.5 h (calculated NCO content: 2.61%). Subsequently 85.2 g of the above-described TMPDGE were added to this polyurethane polymer, and the reaction was continued under reduced pressure at 90° C. until it was no longer possible to measure an NCO content.

Examples 2, 3, 4, 5, 6, and 7, and also the comparative examples Ref. 1 and Ref. 2, were prepared in accordance with Example 1, with the molar ratios indicated in Table 2. In all of the examples of Table 2 the amount of dibutyltin dilaurate was chosen so as to be 0.015% by weight, based on the overall composition.

Thus Examples 2, 3, and 4 correspond to Example 1 with the difference that 1,4-butanediol was replaced by an equivalent amount of ethylene glycol, neopentyl glycol, and 1,6-hexanediol, respectively.

TABLE 2

Preparation of epoxide group-terminated polyurethane polymers: reactants used and their molar ratios.

|  | Ref. 1 | Ref. 2 | 1 | 2 | 3 | 4 | 5 | 6 | 7 |
|---|---|---|---|---|---|---|---|---|---|
| PolyTHF ® 2000 | 1 | 1 | 1 | 1 | 1 | 1 | 1 | 1 | 1 |
| Bisphenol A | 2 | | | | | | | | |
| DABPA | | 1.35 | | | | | | | |
| 1,4-Butanediol | | | 2 | | | | | | |
| Ethylene glycol | | | | 2 | | | | | |
| Neopentyl glycol | | | | | 2 | | | | |
| 1,6-Hexanediol | | | | | | 2 | | | |
| TCD | | | | | | | 0.5 | | |
| Dianol 220 | | | | | | | | 0.5 | 0.25 |
| IPDI | 4 | 3 | 4 | 4 | 4 | 4 | 2.5 | 1.95 | 1.63 |
| TMPDGE | 1 | 0.7 | 1 | 1 | 1 | 1 | 1 | 0.22 | 0.20 |
| D-BADGE | | | | | | | | 0.22 | 0.20 |

Examples of Compositions

The adhesive compositions Z1, Z2, Z3, Z4, Z5, Z5, Z6, Z7 and the comparative compositions ZRef1 and ZRef2 according to Table 3 were prepared as follows:

A planetary mixer is charged with all of the components apart from dicyandiamide and this initial charge is stirred under reduced pressure at 90-100° C. for an hour, then dicyandiamide is added, and, after a further 10 minutes of stirring, the product is dispensed into cartridges.

Test Methods:

Tensile Shear Strength (TSS) (DIN EN 1465)

The test specimens were produced from the compositions described, and using electrolytically galvanized DC04 steel (eloZn) with dimensions of 100×25×1.5 mm, the adhesive area being 25×10 mm at a film thickness of 0.3 mm. Curing took place at 180° C. for 30 minutes. The tensile testing speed was 10 mm/min.

Tensile Strength (TS)/Elongation at Break (EB)/Elasticity Modulus (DIN EN ISO 527)

A sample of the composition was pressed between two pieces of Teflon paper to a layer thickness of 2 mm. The composition was then cured at 180° C. for 30 minutes. The Teflon papers were removed and the test specimens were punched out in the hot state in accordance with the DIN standard. The test specimens were measured after 1 day of storage under standard conditions, with a tensile testing speed of 2 mm/min.

The tensile strength ("TS"), elongation at break ("EB"), and elasticity modulus (0.5-1.0%) ("$EM_{0.5-1.0}$") were determined in accordance with DIN EN ISO 527.

Cleavage Under Dynamic Load (ISO 11343)

The test specimens were produced from the compositions described, using electrolytically galvanized DC04 steel (eloZn) with dimensions of 90×20×0.8 mm, the adhesive area being 20×30 mm at a film thickness of 0.3 mm. Curing was carried out at 180° C. for 30 minutes. The cleavage under dynamic load was measured both at room temperature and at minus 20° C. The impact speed was 2 m/s. The value reported as the fracture energy (FE) in joules is the area under the measurement plot (from 25% to 90%, in accordance with ISO 11343).

Glass Transition Temperature ($T_g$)

The glass transition temperature was determined by means of DSC. This was done using a Mettler DSC822$^e$ instrument. 10-20 mg of each of the compositions were weighed out into an aluminum crucible. After the sample had cured in the DSC at 175° C. for 30 minutes, the sample was cooled to minus 20° C. and then heated to 150° C. at a heating rate of 10° C./min. The glass transition temperature was determined from the DSC plot measured, using the DSC software.

The results of these tests are collated in Table 4.

TABLE 3

Compositions comprising epoxide group-terminated polyurethane polymers. All figures are in % by weight.

|  | ZRef1 | ZRef2 | Z1 | Z2 | Z3 | Z4 | Z5 | Z6 | Z7 |
|---|---|---|---|---|---|---|---|---|---|
| Araldite ® GT 7071 | 25.0 | 25.0 | 25.0 | 25.0 | 25.0 | 25.0 | 25.0 | 25.0 | 25.0 |
| DGEBA | 12.5 | 12.5 | 12.5 | 12.5 | 12.5 | 12.5 | 12.5 | 12.5 | 12.5 |
| Ref. 1 | 38.0 | | | | | | | | |
| Ref. 2 | | 38.0 | | | | | | | |
| 1 | | | 38.0 | | | | | | |
| 2 | | | | 38.0 | | | | | |
| 3 | | | | | 38.0 | | | | |
| 4 | | | | | | 38.0 | | | |
| 5 | | | | | | | 38.0 | | |
| 6 | | | | | | | | 38.0 | |
| 7 | | | | | | | | | 38.0 |
| Dicyandiamide | 2.5 | 2.5 | 2.5 | 2.5 | 2.5 | 2.5 | 2.5 | 2.5 | 2.5 |
| R202 | 4.0 | 4.0 | 4.0 | 4.0 | 4.0 | 4.0 | 4.0 | 4.0 | 4.0 |
| Wollastonite | 18.0 | 18.0 | 18.0 | 18.0 | 18.0 | 18.0 | 18.0 | 18.0 | 18.0 |

TABLE 4

Test results of the compositions.

| | ZRef1 | ZRef2 | Z1 | Z2 | Z3 | Z4 | Z5 | Z6 | Z7 |
|---|---|---|---|---|---|---|---|---|---|
| $EM_{0.5-1.0}$ [MPa] | 1483 | 1199 | 1323 | 1215 | 1187 | 940 | 1012 | 599 | 352 |
| EB [%] | 9.3 | 13.8 | 10.8 | 14.6 | 12.6 | 24.9 | 25.7 | 28.8 | 32.0 |
| TS [MPa] | 35.9 | 27.7 | 31.4 | 30.1 | 27.1 | 25.6 | 25.7 | 19.0 | 15.5 |
| TSS [MPa] | 22.5 | 22.3 | 23.3 | 23.7 | 23.1 | 23.1 | 21.9 | 19.4 | 17.6 |
| FE at 23° C. [J] | 14.1 | 13.8 | 17.9 | 15.4 | 15.0 | 17.2 | 17.9 | 20.4 | 21.6 |
| FE at −20° C. [J] | 11.4 | 10.8 | 17.4 | 14.5 | 13.3 | 19.5 | 17.8 | 19.8 | 20.1 |
| $T_g$ [° C.] | 81.8 | 78.2 | 92.7 | 82.7 | 87.3 | 105.6 | 94.2 | n.d.[1] | n.d.[1] |

[1] n.d. = not determined.

The invention claimed is:

1. An epoxide group-terminated polymer of the formula (I)

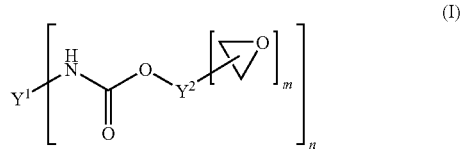

(I)

where

Y1 is an n-valent radical of a linear or branched polyurethane polymer terminated with isocyanate groups, PU1, after the removal of the n terminal isocyanate groups;

Y2 is a radical of an aliphatic, cycloaliphatic, aromatic or araliphatic epoxide containing a primary or secondary hydroxyl group, after the removal of the hydroxide groups and epoxide groups;

m is 1, 2 or 3;

n is 2 to 8;

and where the polyurethane polymer PU1 is obtained from at least one diisocyanate or triisocyanate and from at least one nonphenolic diol Q1 and at least one polymer Q2 having terminal hydroxyl groups, thiol groups, primary amino groups or secondary amino groups, and where the nonphenolic diol Q1 has a number average molecular weight of 60 to 400 g/mol and the polymer Q2 has a number average molecular weight of 600 to 20,000 g/mol.

2. The epoxide group-terminated polymer of claim 1, wherein the nonphenolic diol Q1 is an aliphatic or cycloaliphatic or araliphatic diol.

3. The epoxide group-terminated polymer of claim 2, wherein the nonphenolic diol Q1 is a diol selected from the group consisting of 1,4-butanediol, hexanediol, cyclohexanedimethanol, tricyclodecanedimethanol, 3(4),8(9)-bis(hydroxylmethyl)tricyclo[5.2.1.0(2,6)]decane, xylylenediol, ethoxylated bisphenol A, and propoxylated bisphenol A.

4. The epoxide group-terminated polymer of claim 1, wherein the polymer Q2 is an aliphatic or cycloaliphatic or araliphatic polyol.

5. The epoxide group-terminated polymer of claim 1, wherein the polymer Q2 is an aliphatic polyamine containing ether groups.

6. The epoxide group-terminated polymer of claim 1, wherein the molar ratio Q2:Q1 has a value of 1:2 to 1:0.01.

7. A process for preparing an epoxide group-terminated polymer of claim 1 by the reaction of an isocyanate group-terminated polyurethane polymer PU1 with an aliphatic, cycloaliphatic, aromatic or araliphatic epoxide containing a primary or secondary hydroxyl group.

8. The process of claim 7, wherein the isocyanate group-terminated polyurethane polymer PU1 is prepared from at least one diisocyanate or triisocyanate and from a mixture of at least one nonphenolic diol Q1 and at least one polymer Q2 having terminal hydroxyl groups, thiol groups, primary amino groups or secondary amino groups, and where the nonphenolic diol Q1 has a number average molecular weight of 60 to 400 g/mol and the polymer Q2 has a number average molecular weight of 600 to 20,000 g/mol.

9. The process of claim 7, wherein the isocyanate group-terminated polyurethane polymer PU1 is obtained from a reaction product PU1' containing isocyanate groups and chain-extended with nonphenolic diol Q1, said reaction product PU1' being obtained from at least one diisocyanate or triisocyanate and from a polymer Q2.

10. The process of claim 7, wherein the isocyanate group-terminated polyurethane polymer PU1 is obtained from a reaction product PU1" containing isocyanate groups and chain-extended with polymer Q2, said reaction product PU1" being obtained from at least one diisocyanate or triisocyanate and from a nonphenolic diol Q1.

11. An epoxy resin composition comprising
at least one epoxy resin A having on average more than one epoxide group per molecule;
at least one epoxide group-terminated polymer of the formula (I) of claim 1.

12. The epoxy resin composition of claim 11, wherein the epoxy resin composition further comprises at least one hardener B for epoxy resins which is activated by elevated temperature, and the epoxy resin composition is heat curing.

13. The heat-curing epoxy resin composition of claim 12, wherein the composition further comprises a liquid rubber D in an amount of 1%-35% by weight, based on the weight of the composition.

14. The heat-curing epoxy resin composition of claim 12, wherein the composition further comprises a solid toughener E in an amount of 0.1%-15% by weight based on the weight of the composition.

15. The heat-curing epoxy resin composition of claim 14, wherein the solid toughener E is a core-shell polymer.

16. The heat-curing epoxy resin composition of claim 12, wherein the composition further comprises at least one filler F in an amount of 3%-50% by weight, based on the weight of the composition.

17. The heat-curing epoxy resin composition of claim 12, wherein the composition further comprises an epoxide group-bearing reactive diluent G in an amount of 0.5%-20% by weight, based on the weight of the composition.

18. The heat-curing epoxy resin composition of claim 12, wherein the epoxy resin composition comprises at least one blowing agent in an amount of 0.1%-5% by weight, based on the weight of the composition.

19. The heat-curing epoxy resin composition of claim 12, wherein the fraction of the epoxy resin A is 10%-85% by weight, based on the weight of the composition.

20. The heat-curing epoxy resin composition of claim 12, wherein the fraction of the epoxide group-terminated polymer of the formula (I) is 1%-45% by weight based on the weight of the composition.

21. A cured composition obtained by heating a heat-curing epoxy resin composition of claim 11 to a temperature of 100-220° C.

22. An adhesively bonded article obtained by an adhesive bonding method comprising the steps of
   i) contacting a heat-stable material with the heat-curing epoxy resin composition of claim 11; and
   ii) heating the composition to a temperature of 100-220° C.

23. A method of improving the strength of an adhesive, comprising:
   providing the epoxide group-terminated polymer of the formula (I) of claim 1.

24. An adhesive bonding method, comprising:
   providing the epoxy resin composition of claim 11.

* * * * *